US009092987B2

(12) United States Patent
Bone et al.

(10) Patent No.: US 9,092,987 B2
(45) Date of Patent: Jul. 28, 2015

(54) LANE CHANGE ASSIST INFORMATION VISUALIZATION SYSTEM

(75) Inventors: Sven Bone, Offenbach am Main (DE); Hermann Winner, Bietigheim (DE); Stefan Habenicht, Rossdorf (DE); Jewgeni Selinski, Bodenheim (DE)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 14/113,520

(22) PCT Filed: May 20, 2011

(86) PCT No.: PCT/JP2011/002826

§ 371 (c)(1), (2), (4) Date: Nov. 15, 2013

(87) PCT Pub. No.: WO2012/160590

PCT Pub. Date: Nov. 29, 2012

(65) Prior Publication Data

US 2014/0067250 A1 Mar. 6, 2014

(51) Int. Cl.
*G06F 17/10* (2006.01)
*G08G 1/16* (2006.01)

(52) U.S. Cl.
CPC .................................. *G08G 1/167* (2013.01)

(58) Field of Classification Search
None
See application file for complete search history.

(56) References Cited

U.S. PATENT DOCUMENTS 5,235,316 A * 8/1993 Qualizza ..................... 340/436
5,521,579 A 5/1996 Bernhard
6,269,298 B1 * 7/2001 Seto ............................. 701/96
6,911,918 B2 * 6/2005 Chen ...................... 340/995.13
7,095,318 B1 * 8/2006 Bekhor ....................... 340/485
7,227,454 B2 6/2007 Braeuchle et al.
8,315,756 B2 * 11/2012 Caveney ....................... 701/23
2003/0204299 A1 * 10/2003 Waldis et al. ................ 701/96

(Continued)

FOREIGN PATENT DOCUMENTS

DE 10253510 A1 5/2004
DE 102006011481 A1 9/2007

(Continued)

OTHER PUBLICATIONS

Salvucci, "Inferring Driver Intent: A Case Study in Lane-Change Detection", HFES, 2004, all pages.*

(Continued)

*Primary Examiner* — Calvin Cheung
(74) *Attorney, Agent, or Firm* — Westerman, Hattori, Daniels & Adrian, LLP

(57) ABSTRACT

A lane change assist information visualization system allows a vehicle driver to change lanes with minimum effort and stress by displaying a lane change option that suits the particular lane changing situation in an intuitively understandable manner, and information on the surrounding vehicles adequate for the vehicle driver to make a reasonable decision in changing lanes. The system includes a lane change program computing device (9) that computes at least (a) a lane change possibility, (b) a time period that has to elapse before a lane change is allowed if a lane change possibility does not currently exists, or a time period in which a lane change should be made if a lane change possibility currently exists, and (c) a need for acceleration or deceleration, and a display unit (10) for displaying this information.

10 Claims, 8 Drawing Sheets

(56) References Cited

U.S. PATENT DOCUMENTS

| | | | | |
|---|---|---|---|---|
| 2004/0193374 | A1 * | 9/2004 | Hac et al. | 701/301 |
| 2004/0234136 | A1 * | 11/2004 | Zhu et al. | 382/224 |
| 2005/0015203 | A1 * | 1/2005 | Nishira | 701/301 |
| 2005/0128061 | A1 * | 6/2005 | Yanai | 340/435 |
| 2005/0155808 | A1 * | 7/2005 | Braeuchle et al. | 180/402 |
| 2006/0009910 | A1 * | 1/2006 | Ewerhart et al. | 701/301 |
| 2006/0095193 | A1 | 5/2006 | Nishira et al. | |
| 2006/0151223 | A1 | 7/2006 | Knoll | |
| 2007/0273638 | A1 * | 11/2007 | Nohno et al. | 345/156 |
| 2007/0286030 | A1 * | 12/2007 | Brech | 368/89 |
| 2007/0296566 | A1 * | 12/2007 | Chinomi et al. | 340/435 |
| 2009/0088925 | A1 | 4/2009 | Sugawara et al. | |
| 2009/0187343 | A1 | 7/2009 | Koch-Groeber et al. | |
| 2009/0237230 | A1 * | 9/2009 | Ponziani | 340/457 |
| 2010/0082195 | A1 * | 4/2010 | Lee et al. | 701/25 |
| 2010/0283591 | A1 | 11/2010 | Schick | |
| 2010/0328055 | A1 * | 12/2010 | Fong et al. | 340/425.5 |
| 2011/0130936 | A1 * | 6/2011 | Noda | 701/70 |
| 2011/0227713 | A1 * | 9/2011 | Amann | 340/435 |
| 2011/0313665 | A1 * | 12/2011 | Lueke et al. | 701/301 |
| 2012/0245833 | A1 * | 9/2012 | Zaitsu et al. | 701/117 |
| 2013/0250112 | A1 * | 9/2013 | Breed | 348/148 |
| 2014/0152432 | A1 * | 6/2014 | Zobel et al. | 340/435 |

FOREIGN PATENT DOCUMENTS

| | | | | |
|---|---|---|---|---|
| DE | 102006049249 | A1 | 4/2008 | |
| DE | 102008003936 | A1 | 7/2008 | |
| EP | 1490246 | A1 | 12/2004 | |
| EP | 1785326 | A1 | 5/2007 | |
| JP | 2000-185610 | A | 7/2000 | |
| JP | 2003-077093 | A | 3/2003 | |
| JP | 2003-331400 | A | 11/2003 | |
| JP | 2005-284669 | A | 10/2005 | |
| JP | 2006-113918 | A | 4/2006 | |
| JP | 2006-151215 | A | 6/2006 | |
| JP | 2006-284458 | A | 10/2006 | |
| JP | 2006-309445 | A | 11/2006 | |
| JP | 2007-127598 | A | 5/2007 | |
| JP | 2007-153307 | A | 6/2007 | |
| JP | 2007-164328 | A | 6/2007 | |
| JP | 2009-078735 | A | 4/2009 | |
| KR | 101371746 | B1 * | 3/2014 | B60W 30/12 |
| WO | 03/004299 | A1 | 1/2003 | |
| WO | 2007/123176 | A1 | 11/2007 | |
| WO | 2010/119481 | A1 | 10/2010 | |

OTHER PUBLICATIONS

International Search Report of PCT/JP2011/002826, mailing date of Jul. 19, 2011.

Extended European Search Report dated Dec. 19, 2014, issued in corresponding EP Application No. 11866173.5 (10 pages).

International Search Report dated Jul. 19, 2011, issued in Application No. PCT/JP2011/002827. (2 pages).

Office Action dated Jan. 27, 2015, issued in Japanese Application No. 2013-516066. (4 pages).

* cited by examiner

LANE CHANGE ASSIST INFORMATION VISUALIZATION SYSTEM

TECHNICAL FIELD

The present invention relates to a lane change assist information visualization system allows a vehicle driver to change lanes with minimum effort and stress.

BACKGROUND OF THE INVENTION

Various proposals have been made to assist a vehicle driver traveling over a roadway so as to maximize the driving comfort and minimize the driving risks. One of the highly stressful maneuvers that a vehicle driver has to make on a regular basis is changing lanes. When a lane change is desired, the vehicle driver has to determine if there is any other vehicle (object vehicle) in the target lane. The ego vehicle must move to the new lane by keeping an adequate distance to the object vehicle to safely complete the lane change without alarming the driver of the object vehicle. When changing lanes, the vehicle driver is often required to accelerate or decelerate the ego vehicle to keep an adequate distance to the object vehicle for the whole duration of the lane change maneuver.

The vehicle driver of the ego vehicle also have to watch out if there is any vehicle traveling ahead of the ego vehicle so that the vehicle in the same lane may not interfere with the lane change maneuver of the ego vehicle.

Therefore, the vehicle driver is required to pay attention to both the vehicle in the current lane and the vehicle or vehicles in the new lane before and during the lane change maneuver. This causes a significant stress to the vehicle driver, and there is a demand for systems that assist the vehicle driver in changing lanes in an optimum fashion.

Patent Document 1 describes a method for supporting the driver in controlling a vehicle, in particular a vehicle equipped with environment sensors which indicate continuously the environment information and the actual risk potential. The proposed method indicates the current risk potential but does not initiate any countermeasures or a recommendation as to how to reduce the current risk potential. Therefore, this prior art does not provide any assistance as to how to react on a real-time basis.

Patent Document 2 describes a method to inform a vehicle driver by a driver information system consisting of a sensor, an evaluation unit and an optical visualization unit. The visualization unit displays the ego vehicle and the existence and nonexistence of a risk potential including the direction of the potential risk. The method indicates the current risk potential and the direction thereto but does initiate any countermeasures or a recommendation as to how to reduce the current risk potential. Therefore, this prior art does not provide any assistance as to how to react on a real-time basis.

Patent Document 3 discloses a vehicle driving assist system which is configured to convey a risk potential relating to a preceding obstacle to a driver using both visual information and haptic information. For example, the vehicle driving assist system executes accelerator pedal actuation reaction force control such that an actuation reaction force is generated in accordance with a risk potential that expresses a degree of convergence between the host vehicle and a preceding obstacle. In order to convey to the driver in a clear manner which preceding obstacle such as a vehicle is an obstacle targeted by the risk potential calculation and the reaction force control, the system displays a reference frame or marker at a position corresponding to the targeted obstacle.

At least one of size, color, shape and brightness of the marker is set in accordance with the risk potential.

This method highlights (for instance, by a rectangle, circle, brightness, etc.) the relevant object selected by the driver assist system (such as the relevant object selected for the distance control by an adaptive cruise control system). In addition, vehicles with a high risk potential are marked by a warning symbol. Nevertheless, this prior invention does not initiate any countermeasures or a recommendation as to how to reduce the current risk potential. Therefore, it is still unclear for the driver as to how to react correctly in the given situation.

Patent Document 4 discloses a warning indication displaying device for aiding a truck driver. The device displays a plurality of bars include one that represents a relative speed of a detected object. The device is incorporated in a mirror arrangement with a mirror plate. Detecting units are provided for detection of the distance to an object in a motor vehicle rear area, distance to the object on an adjacent lane and/or presence of an object in a dead angle range. The warning indication produced by the distance of object detection is displayed in the mirror plate. The bar display is provided for representation of the relative speed of the detected object.

This method informs the driver about vehicles driving on the adjacent lanes by showing the relative speed and/or distance in the bar display. The invention does not initiate any countermeasure or a recommendation as to how to reduce the current risk potential. Therefore, it is still unclear for the driver as to how to react correctly in the given situation.

Patent Document 5 discloses a display unit for an assistance or support system for transport means. The aim of the invention is to provide at least one device that is assigned to transport means, in particular at least one motor vehicle, notably for the intuitive detection of the operating and/or system status of at least one assistance or support system that is designed for the transversal guidance of the transport means, whereby the consumer acceptance of the assistance or support system is increased, for example, by the option of an evaluation of the system behavior at any time by the driver of the transport means. To achieve this, the invention is provided with at least one display element for displaying the respective operating and/or system status. The display element can be configured as a steering wheel, trapezoidal lines or as a double arrow. The activity of the device can be displayed via a display element.

The invention pertains to a system indicating the current system state (e.g. on or active) of a lateral assistance systems, and does not provide any information regarding other vehicles or other objects surrounding the ego vehicle.

Patent Document 6 discloses a visibility improvement device in a motor vehicle, and this device includes a processing unit configured to detect a road profile from acquired optical signals and control a signaling arrangement accordingly. The device has at least one infrared sensitive image sensor system for acquiring optical signals from the motor vehicle's surroundings, at least one signaling arrangement for generating driver information and at least one processing unit for controlling the signaling arrangement depending on the acquired optical signals. The processing unit has an arrangement for detecting the road profile from the optical signal and controlling the signaling arrangement accordingly. Independent claims are also included for the following: (a) a method of improving the view in a motor vehicle; and (b) a computer program.

The invention disclosed in this prior patent publication indicates the course of the road and additional objects (such as vehicles, pedestrians, etc.) but does not initiate any countermeasures or a recommendation as to how to reduce the current risk potential. Therefore, it is still unclear for the driver as to how to react correctly in the given situation.

PATENT DOCUMENTS

Patent Document 1—DE 10 2006 011 481 A1 (US2009/0187343)
Patent Document 2—DE 10 2006 049 249 A1 (U52010/0283591)
Patent Document 3—EP 1785326A1 (JP2007-153307A)
Patent Document 4—DE 10 2008 003 936 A1
Patent Document 5—WO 2003/004 299 A1 (U.S. Pat. No. 7,227,454)
Patent Document 6—DE 10 253 510A1 (US2006/0151223)

BRIEF SUMMARY OF THE INVENTION

In view of such problems of the prior art, a primary object of the present invention is to provide a lane change assist information visualization system that allows a vehicle driver to change lanes with minimum effort and stress.

A second object of the present invention is to provide a lane change assist information visualization system that can offer lane change options in an intuitively understandable manner.

A third object of the present invention is to provide a lane change assist information visualization system that can offer information on the surrounding vehicles adequate for the vehicle driver to make a reasonable decision in changing lanes.

Such objects of the present invention can be accomplished by providing a lane change assist information visualization system, comprising: an ego vehicle sensing device (4) configured to detect a velocity of an ego vehicle; a object vehicle sensing device (2) configured to detect at least a distance to the ego vehicle and a velocity of a surrounding vehicle; a driver intention detecting device (5) configured to detect a driver's intention to change lanes; a lane change program computing device (9) for computing, according to signals from the ego vehicle sensing device, object vehicle sensing device and driver intention detecting device, (a) a lane change possibility, (b) a time period that has to elapse before a lane change is allowed if a lane change possibility does not currently exists, or a time period in which a lane change should be made if a lane change possibility currently exists; and (c) a need for acceleration or deceleration; and a display unit (10) configured to indicate the lane change possibility, the time period and the need for acceleration or deceleration computed by the lane change program computing device.

As the display unit provides adequate information on the surrounding vehicles adequate for the vehicle driver to make a reasonable decision in changing lanes, the vehicle driver is allowed to execute a lane change with minimum effort and stress.

For this purpose, the lane change program computing device may be configured to compute a position of an object vehicle, and the display unit is configured to indicate the position of the object vehicle in relation to the ego vehicle. So that the lane change options may be indicated in an intuitively understandable manner, the position of the object vehicle in relation to the ego vehicle may be indicated by a plan view graphics.

To further enhance the understandability of the display contents, the display unit may indicate the existence and absence of the current lane change possibility in different colors, the time period by a length of a bar displayed on the display unit, and/or the need for acceleration, need for deceleration and need for neither by different graphics.

According to a preferred embodiment of the present invention, the display unit further displays a lane marker that changes appearance depending on the lane change possibility. For instance, when the system recommends a lane change, the corresponding line marker may be caused to blink, or may be shown in a different color. To avoid cluttering of the instrument panel, the display unit for the lane change assist information visualization system may be consolidated with a display unit for an adaptive cruise control system or a lane keeping system.

BRIEF DESCRIPTION OF THE DRAWINGS

Now the present invention is described in the following with reference to the appended drawings, in which.

DETAILED DESCRIPTION OF THE PREFERRED EMBODIMENTS

When a vehicle (ego vehicle) is traveling on a multi lane motorway, the vehicle driver inevitably runs into a situation where a lane change is required. There may be a slow vehicle traveling ahead of the ego vehicle, or the ego vehicle may have to move to a left or right lane because of an impending need to make a left or right turn at the next intersection. At such a time, the driver continually controls the ego vehicle in both longitudinal and lateral directions not only before the lane change but also during and after the lane change. At the same time, the driver monitors the surrounding vehicles over a plurality of lanes. The driver often experiences problems in correctly judging whether a gap between two cars on the target lane is suitable for the intended lane change or merge maneuver. The driver may not be able to determine the correct timing to start the lane change maneuver and select the optimum speed of the vehicle before, during and after the lane change. A considerable effort and extensive driving experience is required for the vehicle driver to make correct judgment in each instance.

Blind spot warning systems (BSW) are already on the market, and are specified in the international standard for Intelligent Transport Systems under LDAS (Lane Change Decision Aid Systems: ISO 17387). But these systems just warn the driver when another vehicle is in the blind spot area (Type I) or is approaching from behind with a high relative speed (Type II) when the driver initiates a lane change maneuver. They do not provide any information about the best gap, optimal speed, required acceleration, optimal distance or optimal timing for the lane change. The BSW systems are pure reactive systems, and thus have a limited potential to reduce the driver's workload. For this reason, these systems have a limited potential to reduce the risk of colliding with a vehicle traveling in the adjacent lane.

Figure 1:
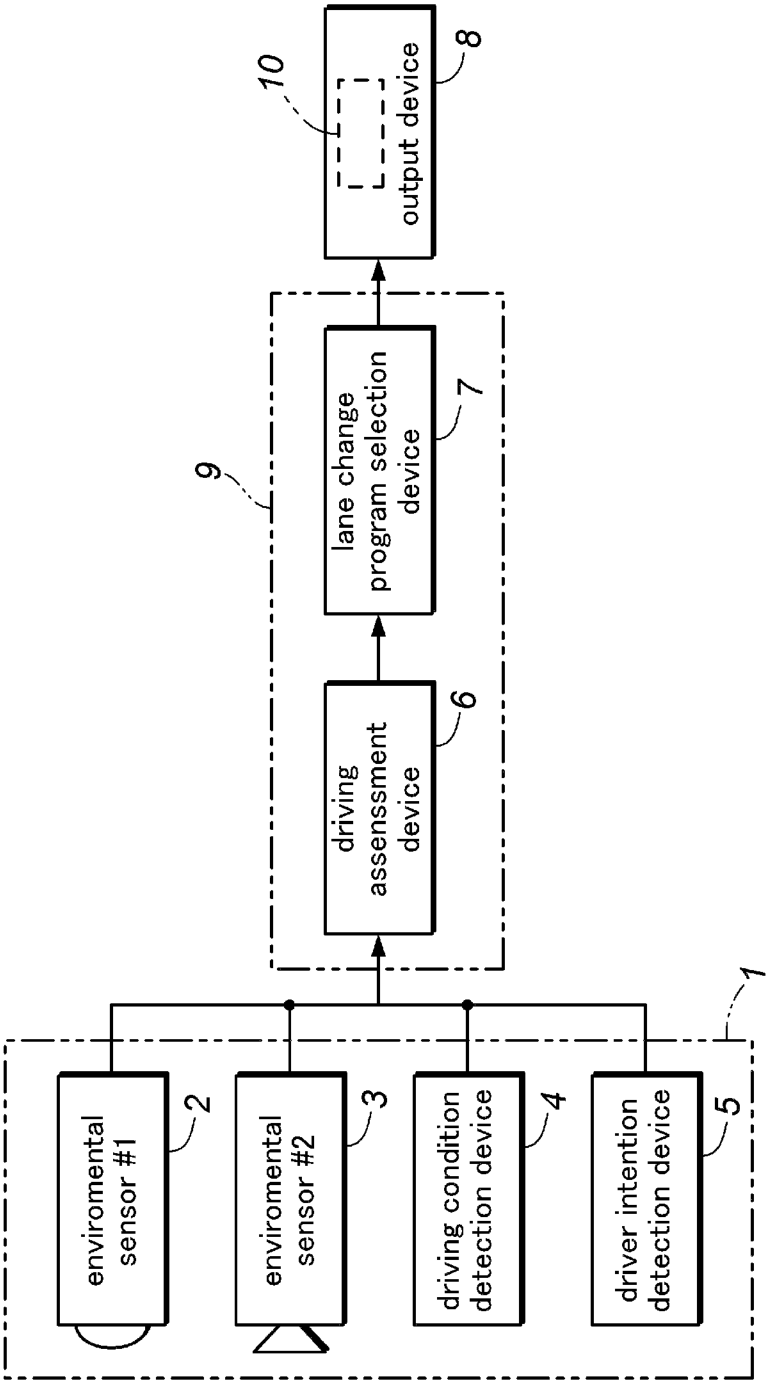
FIG. 1 is a block diagram of a lane change assist system embodying the present invention.

FIG. 1 depicts a block diagram configured to implement the method of the present invention. A sensor device 1 comprises at least an environmental sensor 2 which is configured to sense objects such as vehicles in the front, right, left and/or rear of the ego vehicle, and an optional additional environmental sensor 3 for detecting lane markers. The sensor device 1 further comprises a driving condition detection device 4 configured to measure the dynamics of the ego vehicle such as the speed, acceleration and trajectory of the ego vehicle, and a driver intention detection device 5 configured to detect the driver's intention to change lanes. The detection of the driver's intention may be based on the activation of a turning signal, a manual switch operated by the driver, or a detector that detects a lateral acceleration or yaw rate of the ego vehicle as a sign of initiating a lane change. For more possible forms of driver's intention detection that may be used for the implementation of the present invention, reference should be made PCT/JP2010/004102 filed by the same applicant as this application.

The output signals of the sensor device 1 are forwarded to a lane change program computing device 9 that includes a driving assessment device 6 which assesses the current/future driving alternative or driving situation and selection of the best gap in the target lane according to the received signals. The lane change program computing device 9 additionally includes a lane change program selection device 7 which receives an output signal of the driving assessment device 6, and selects a corresponding lane change program according to the received signal. The lane change program selected by the lane change program selection device 7 is forwarded to an output device 8 configured to indicate the lane change program selected by the lane change program selection device 7 by using an appropriate medium. The output device 8 may display the selected program on a visual display unit 10 and/or control the longitudinal and lateral vehicle dynamics via a human-machine interface (HMI) system.

The driving assessment device 6 is programmed to determine a current driving alternative from a plurality of choices according to the output of the sensor device 1. There are at least three scenarios that give rise to different driving alternatives.

Figure 2A:
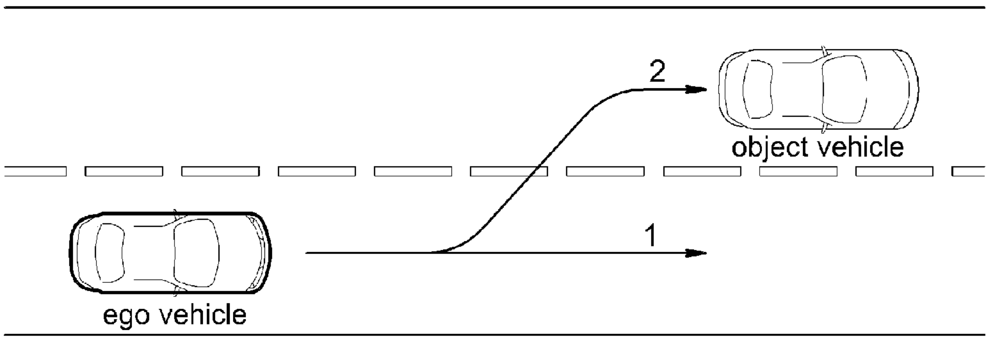
FIGS. 2*a* to 2*c* are diagrams showing different driving alternatives when changing lanes.

In Scenario 1, as shown in FIG. 2*a*, the ego vehicle is driving on the right lane (on the assumption that the vehicle travels on the right side of the road), and another vehicle (object vehicle) is traveling at a faster speed in front of the ego vehicle of the left adjacent lane. The driver has two alternatives for the ego vehicle; the ego vehicle may stay in the current lane, or the ego vehicle may move to the left adjacent lane, if necessary, by decelerating so as to follow the object vehicle at a safe distance.

Figure 2B:
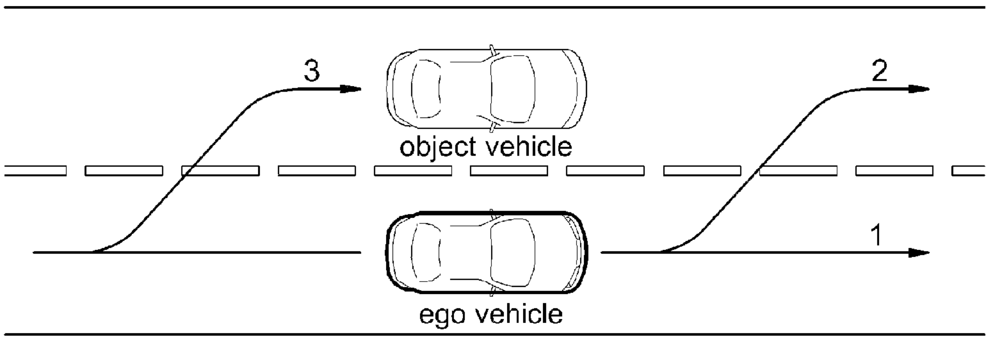

In Scenario 2, as shown in FIG. 2*b*, the ego vehicle is traveling besides an object vehicle at a same speed. The driver is therefore unable to change lanes without colliding with the object vehicle on the target lane. The driver has three choices for the ego vehicle in this case; the ego vehicle may stay in the current lane with an option to accelerate or decelerate, or may change to the left adjacent lane either before or behind the object vehicle again with an option to accelerate or decelerate.

Figure 2C:
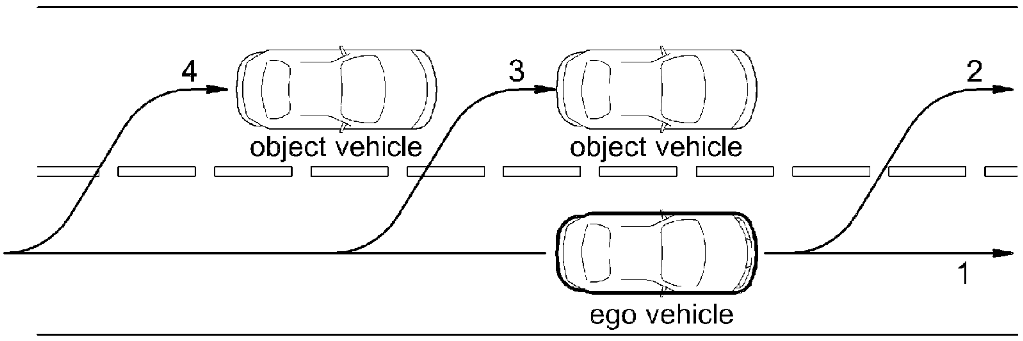

In Scenario 3, as shown in FIG. 2*c*, the ego vehicle is traveling on the right lane, and a pair of object vehicles are traveling on the left adjacent lane one behind the other. The driver has four choices for the ego vehicle in this case; the ego vehicle may stay in the current lane, overtake the preceding object vehicle to make a lane change to the left adjacent lane before the preceding object vehicle, merge into a gap between the two object vehicles, or make a lane change to the left adjacent lane behind the following object vehicle. In each case, the vehicle driver has an option to accelerate or decelerate as required.

Based on the existing scenarios and driving alternatives available to the vehicle driver under the particular situation, the lane change program selection device 7 selects a lane change program from a plurality of (five in the illustrated embodiment as will be discussed hereinafter) choices which are mainly characterized by different acceleration profiles. Depending on the position of the gap (front, besides and rear) and the relative speed of the gap, the lane change program selection device 7 selects a specific lane change profile to enable the vehicle driver (or the driver assistance system) to synchronize the ego vehicle with the target gap.

Figure 3:
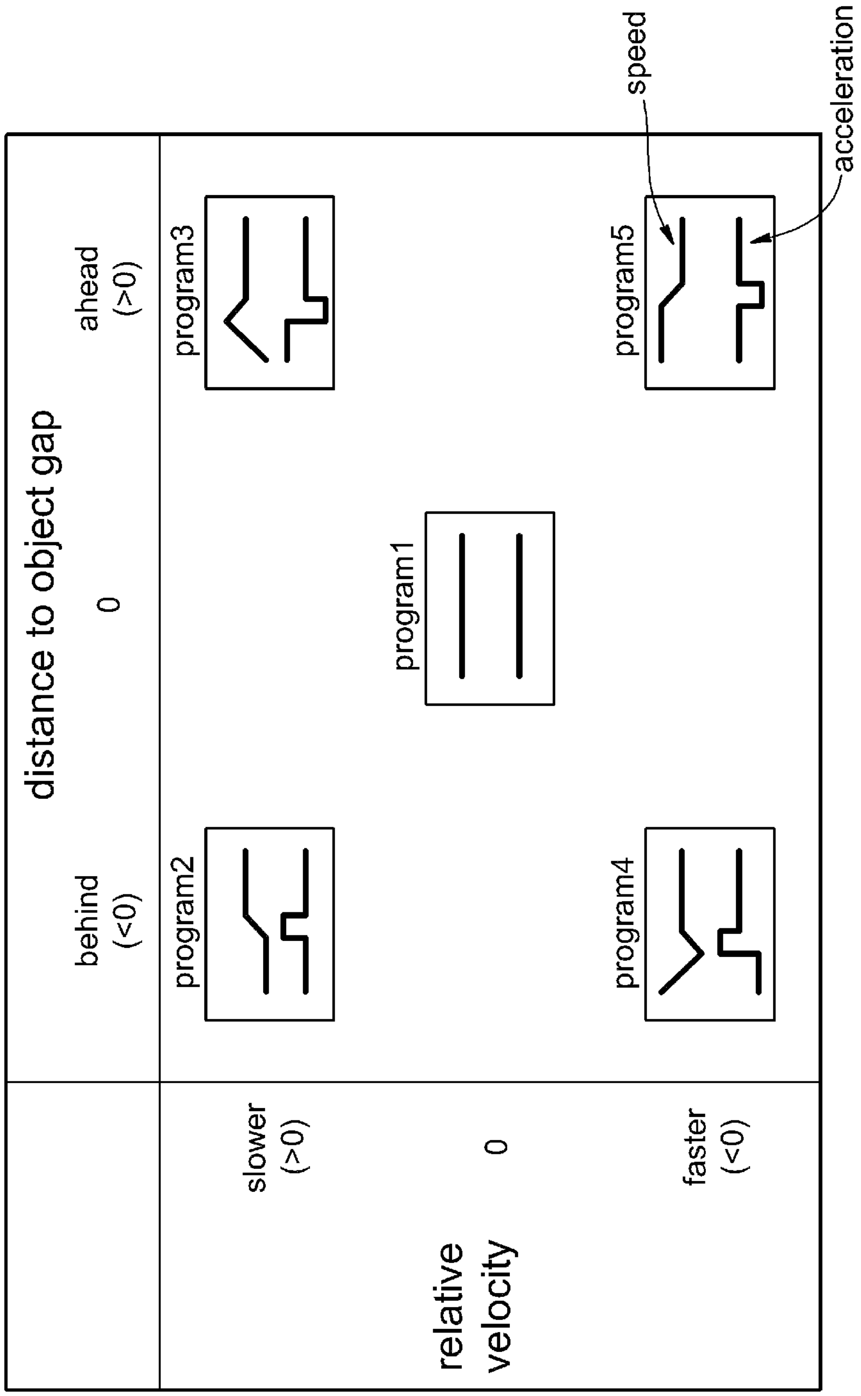
FIG. 3 is a diagram showing various lane change programs that may be selected depending on the relative velocity of an object vehicle and the distance to the object vehicle.

To realize a maneuver-based lane change assist system with a high customer acceptance, the gap synchronization should be geared to the human lane change/merge behavior as much as possible. Therefore, the lane change program selection device 7 differentiates four lane change programs as depicted in FIG. 3 in addition to a default or trivial situation where no lane change is contemplated, and the vehicle continues to travel straight ahead. The selection of the lane change program depends on the driver's lane change intention (false: driver intends to stay in current lane; true: driver intends to change to adjacent lane) and the lane change profile which is described by an acceleration, deceleration or constant speed profile to synchronize with the target gap. Depending on the selected lane change program, the output unit 8 realizes a human oriented behavior guideline (acceleration and timing profile) based on the corresponding driver's lane change profile. This ensures a continuous driver's system understanding because the system reacts in the specific lane change situation like a human would do. If desired, the system may be provided with a learning mechanism to compile the vehicle driver's habit of changing lanes, and use the obtained data in selecting the lane change program.

Referring to FIG. 3, when the driver intention detection device 5 detects no driver's intension to change lanes, the system produces no output from the output device 8, and the ego vehicle behaves no different from a conventional vehicle.

When the driver's intention to change lanes is detected by the driver intention detection device 5, the vehicle driver is guided by the system according to the relative position and speed of the gap in the adjacent left lane. If the gap is besides the ego vehicle and the gap is traveling at the same speed as the ego vehicle, or there is no object vehicle on the left adjacent lane, the ego vehicle can change lanes without any acceleration (program 1). If the gap is behind the ego vehicle, and traveling slower than the ego vehicle, the ego vehicle is allowed to change lanes with a relatively low level acceleration (program 2). If the gap is ahead of the ego vehicle, and traveling slower than the ego vehicle, the ego vehicle is guided to overtake the gap by a high level acceleration, and then allowed to change lanes (program 3). The ego vehicle may cease the acceleration or, if desired, may decelerate upon completion of the lane change.

If the gap is behind the ego vehicle, and traveling faster than the ego vehicle, the ego vehicle is guided to fall behind the object vehicle by a high level deceleration, and then allowed to move into the gap behind the object vehicle (program 4). The ego vehicle may cease the deceleration or, if desired, may accelerate upon completion of the lane change. If the gap is ahead of the ego vehicle, and traveling faster than the ego vehicle, the ego vehicle is allowed to change lanes with a relatively low level deceleration (program 5).

The low level acceleration (deceleration) as used herein means an acceleration (deceleration) of a relatively low level and/or an acceleration (deceleration) of a relatively short time duration. Likewise, the high level acceleration (deceleration) as used herein means an acceleration (deceleration) of a relatively high level and/or an acceleration (deceleration) of a relatively long time duration.

The guidance information produced by the lane change program selection device 7 must be made known to the vehicle driver via the output device 8. The output device 8 may comprise any of known HMI systems. The visual display unit 10 that may be included in the output device 8 of the illustrated embodiment is configured to communicate the information produced by the lane change program selection device 7 to the vehicle driver. The visual display unit 10 preferably displays at least some of the following data:

(1) the direction of a lane change;
(2) the permissibility of a lane change:
(3) a necessary wait period before a lane change or a remaining time period for a lane change;
(4) recommended acceleration/deceleration; and
(5) the position of an object vehicle or vehicles.

FIG. 4 shows three examples of the display that can be displayed on a first embodiment of the visual display unit 10 according to the present invention.

An arrow 11, 11' is selectively shown in the left or right upper corner to indicate that a lane change either to the left or right lane is detected. The arrow 11, 11' may be indicated by different colors, green when a lane change can be made and red when a lane change cannot be made. A vertical bar 12, 12' may be shown under the arrow 11, 11' at the same time. The time period for which the driver has to wait before a left lane change can be safely made, or the time period remaining for the driver to safely change lanes to the left is indicated by the length of the highlighted part of the bar 13, 13'. The highlighting may be indicated by a different gradation or shading of a part of the bar. More preferably, the lower part of the bar 12, 12' may be colored green or red depending on the colored part of the bar represents the time period that has to elapse before a lane change can be safely made or the time period that is remaining for a lane change can be safely made.

The central graphic 14 indicates the need for acceleration or deceleration. When the central graphic 14 is a circle, the driver is guided to keep the current speed. When the central graphic 14 consists of two overlapping triangles having apices directed upward, the driver is guided to accelerate at high level. When only one of the triangles is indicated, the driver is guided to accelerate at a low level. Conversely, when the central graphic 14 consists of two overlapping triangles having apices directed downward, the driver is guided to decelerate at a high level. In this case also, when only one of the triangles having an apex directed downward is indicated, the driver is guided to decelerate at a low level.

Figure 4A:
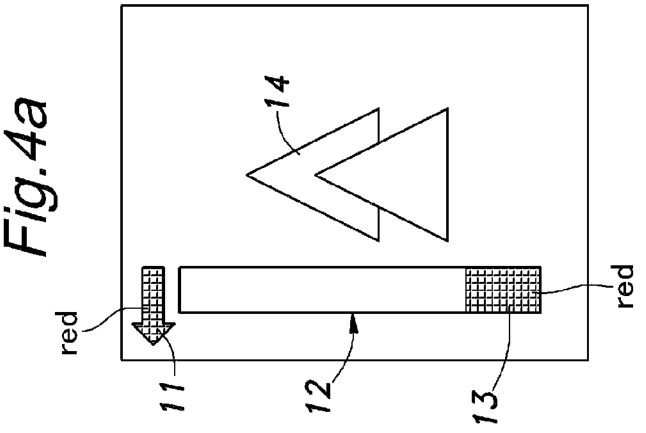
FIGS. 4*a* to 4*c* show three different display examples of a first embodiment of the display unit for the visualization of various lane change programs.
Figure 4B:
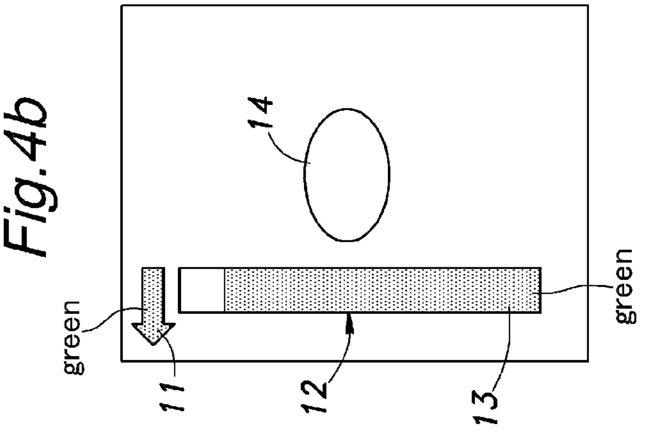
Figure 4C:
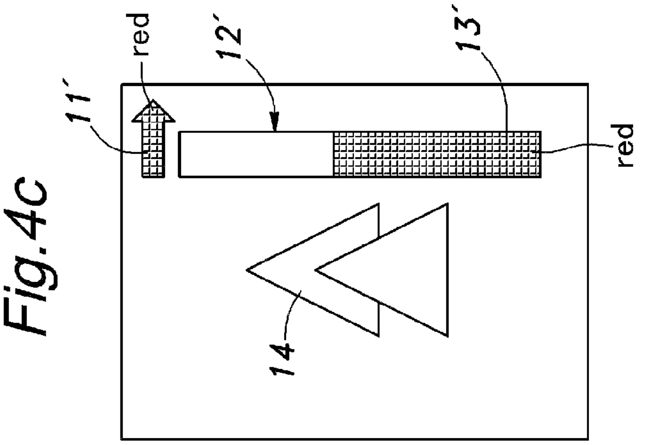

In the example given in FIG. 4*a*, the left arrow 11 and highlighted part 13 of the vertical bar 12 are given in red color to indicate that a left lane change is currently not possible, and a time period indicated by the length of the red part 13 of the bar 12 must elapse before the vehicle driver is able to safely change lanes to the left. At the same time, the central graphic 14 guides the vehicle driver to strongly accelerate. In the example given in FIG. 4*b*, the left arrow 11 and highlighted part 13 of the vertical bar are given in green color to indicate that a left lane change is currently possible, and the length of the green part 13 of the vertical bar 12 indicate the time period remaining for the left lane change to be safely made. The circular central graphic 14 indicates that the vehicle driver may keep the current speed. In the example given in FIG. 4*c*, the right arrow 11' and highlighted part 13' of the vertical bar 12' are given in red color to indicate that a right lane change is currently not possible, and a time period indicated by the length of the red bar must elapse before the vehicle driver is able to safely change lanes to the right. At the same time, the vehicle driver is guided to strongly accelerate by the central graphic 14.

This visual display unit 10 may be activated when selected by the vehicle driver and/or when an intension of the vehicle driver to change lanes is detected. The intension of the vehicle driver to change lanes may be detected by the activation of a turn signal, the arrangement proposed in PCT/JP2010/004102 filed by the same applicant as this application, or any other known arrangement for detecting the intention of the vehicle driver.

FIG. 5 shows two examples of the display that can be displayed on a second embodiment of the visual display unit 10 according to the present invention. The display includes a trapezoidal graphic 15 which may considered as a simplified bird's eye view of the profile of the ego vehicle, a left and a right arrow 16 to indicate the direction of the lane change, and a group of acceleration/deceleration symbols 18 similar to those of the first embodiment arranged in a vertical row within the trapezoidal graphic 15. The color of a bar 17 shown in either arrow 16 indicates the permissibility of a lane change in the direction indicated by the arrow 16. A lane change can be made safely when the color of the bar 17 is green, and cannot be made safely when the color of the bar 17 is red. The length of the red bar 17 in either arrow 16 indicates the time period that must elapse before the vehicle driver is able to safely change lanes in the corresponding direction. The length of the green bar 17 in either arrow 16 indicates the time period remaining for the lane change in the corresponding direction to be safely made. The meanings of the acceleration/deceleration symbols 18 are similar to those of the first embodiment. Additionally, a blue line 19 extending radially across a peripheral part of the trapezoidal graphic 15 indicates the direction in which an object vehicle can be found.

Figure 5A:
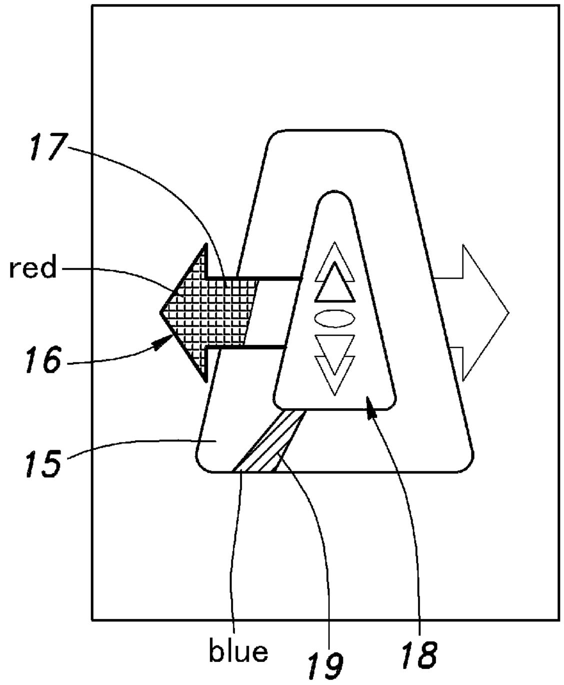
FIGS. 5*a* and 5*b* show two different display examples of a second embodiment of the display unit for the visualization of various lane change programs.

In the example given in FIG. 5*a*, a left change may be contemplated but is not permitted until a time period corresponding to the length of the red bar 17 has elapsed. The blue line 19 indicates the presence of an object vehicle on the left lane way behind the ego vehicle. The single-triangle acceleration/deceleration symbol 18 indicates the need for a weak acceleration to enable the ego vehicle to move adequately ahead of the object vehicle for a safe left lane change.

Figure 5B:
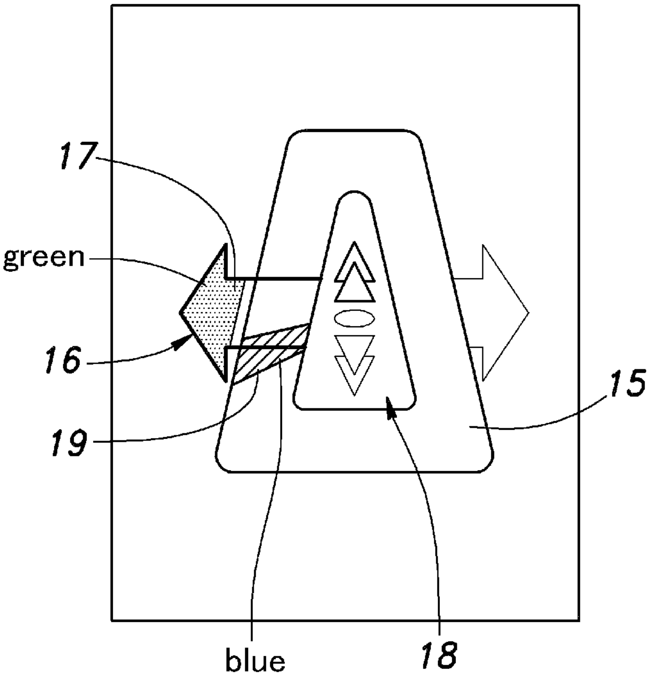

In the example given in FIG. 5*b*, a left lane change is permitted, and the time period remaining for the permitted left lane change to be executed is indicated by the length of the green bar 17 in the left arrow 16. The blue line 19 indicates the presence of an object vehicle on the left lane besides the ego vehicle. Accordingly, the double-triangle acceleration/deceleration symbol 18 indicates the need for a strong acceleration to enable the ego vehicle to move adequately ahead of the object vehicle for a safe left lane change.

FIG. 6 shows two examples of the display that can be displayed on a third embodiment of the visual display unit 10 according to the present invention. The display includes an arrow 21 extending vertically from a central lower part of the display, and is bent either to the left or to the right. In the illustrated embodiment, the free end of each arrow 21 crosses a line representing a left lane marker 24, and then extends vertically in parallel with the base end thereof.

A right lane marker 25 is also displayed. The left and right arrows 21 indicate a lane change to the left and a lane change to the right, respectively. The color of a bar 22 shown in either arrow 21 indicates the permissibility of a lane change in the direction indicated by the arrow. A lane change can be made safely when the color of the bar 22 is green, and cannot be made safely when the color of the bar 22 is red. The length of the red bar 22 in either arrow 21 indicates the time period that must elapse before the vehicle driver is able to safely change lanes to the corresponding side. The length of the green bar 22 in either arrow 21 indicates the time period remaining for the lane change to the corresponding side to be safely made. An acceleration/deceleration symbol 23 may be shown immediately below the base end or lower end of the arrow 21. The acceleration/deceleration symbol 23 indicates the need for acceleration or deceleration in a similar fashion as in the previous embodiments.

Figure 6A:
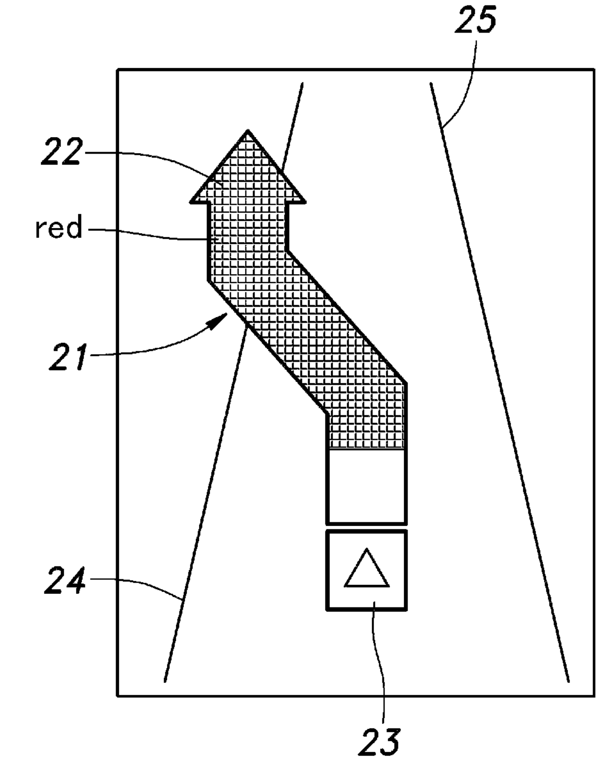
FIGS. 6*a* and 6*b* show two different display examples of a third embodiment of the display unit for the visualization of various lane change programs.
Figure 6B:
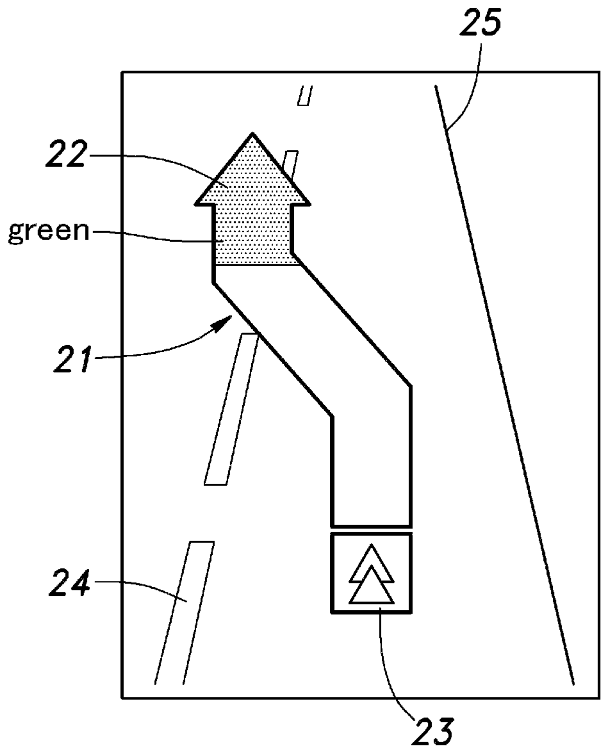

In the example given in FIG. 6*a*, a left lane change is being contemplated, but cannot be made safely under the current condition. The waiting time for a safe lane change is indicated by the length of the red bar 22 in the arrow 21, and a light acceleration is recommended. In the example given in FIG. 6*b*, a left lane change is being contemplated, and can be made safely for a time duration indicated by the length of the green bar 22 in the arrow 21. Also, a high acceleration is recommended. The permissibility of the left lane change is additionally indicated by showing the left lane marker 24 as a dotted line and/or making the left lane marker 24 blink.

FIG. 7 shows two examples of the display that can be displayed on a fourth embodiment of the visual display unit 10 according to the present invention. The display includes a horizontal arrow 31 directed both ways. One of the left and right ends of the arrow 31 is shown depending on if a left lane change or a right left change is being contemplated. The color of a bar 32 shown in the arrow 31 indicates the permissibility of a lane change in the direction indicated by the arrow 31. A lane change can be made safely when the color of the bar 32 is green, and cannot be made safely when the color of the bar 32 is red. The length of the red bar 32 in either arrow 31 indicates the time period that must elapse before the vehicle driver is able to safely change lanes to the corresponding side. The length of the green bar 32 in either arrow 31 indicates the time period remaining for the lane change to be safely made. An acceleration/deceleration symbol 33 may be shown below the arrow 31. The acceleration/deceleration symbol 33 indicates the need for acceleration or deceleration by an arrow directed upward or downward. In the illustrated embodiment, acceleration and deceleration may be recommended each in three levels by showing an upward or downward arrow of a corresponding length. A pair of line markers 34 and 35 are represented on either side of the acceleration/deceleration symbol 33.

Figure 7A:
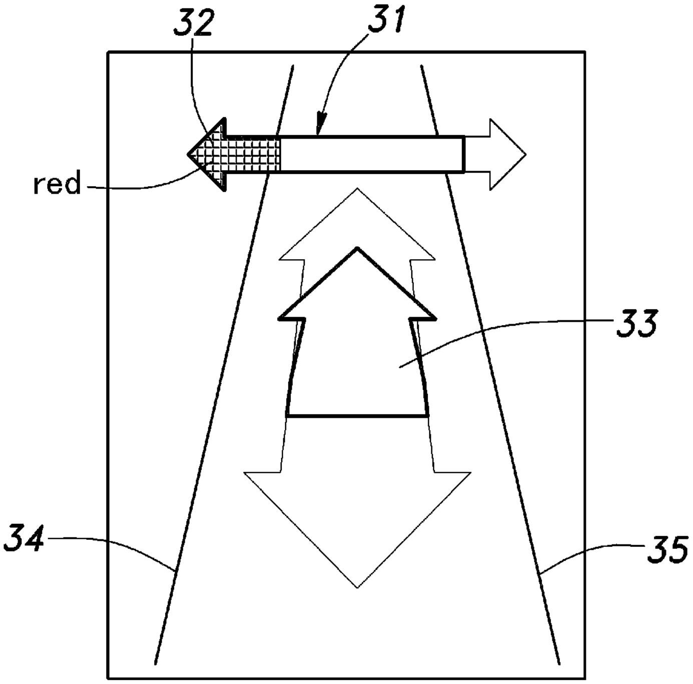
FIGS. 7*a* and 7*b* show two different display examples of a fourth embodiment of the display unit for the visualization of various lane change programs.
Figure 7B:
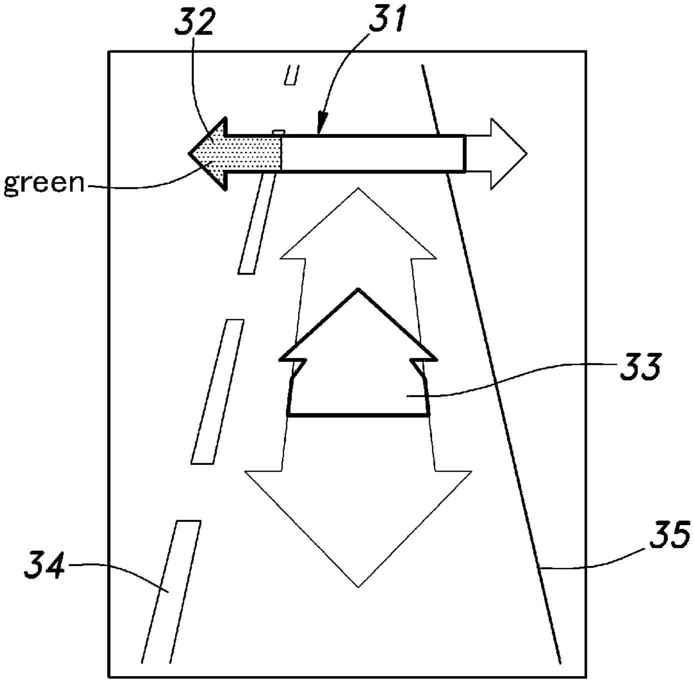

In the example given in FIG. 7*a*, a left lane change is being contemplated, but cannot be made safely under the current condition. The waiting time for a safe lane change is indicated by the length of the red bar 32 in the arrow 31, and a medium acceleration is recommended. In the example given in FIG. 7*b*, a left lane change is being contemplated, and can be made safely for a time duration indicated by the length of the green bar 32 in the arrow 31, and a slight acceleration is recommended. The permissibility of the left lane change is additionally indicated by showing the left lane marker 34 as a dotted line and/or making the left lane marker 34 blink.

Figure 8:
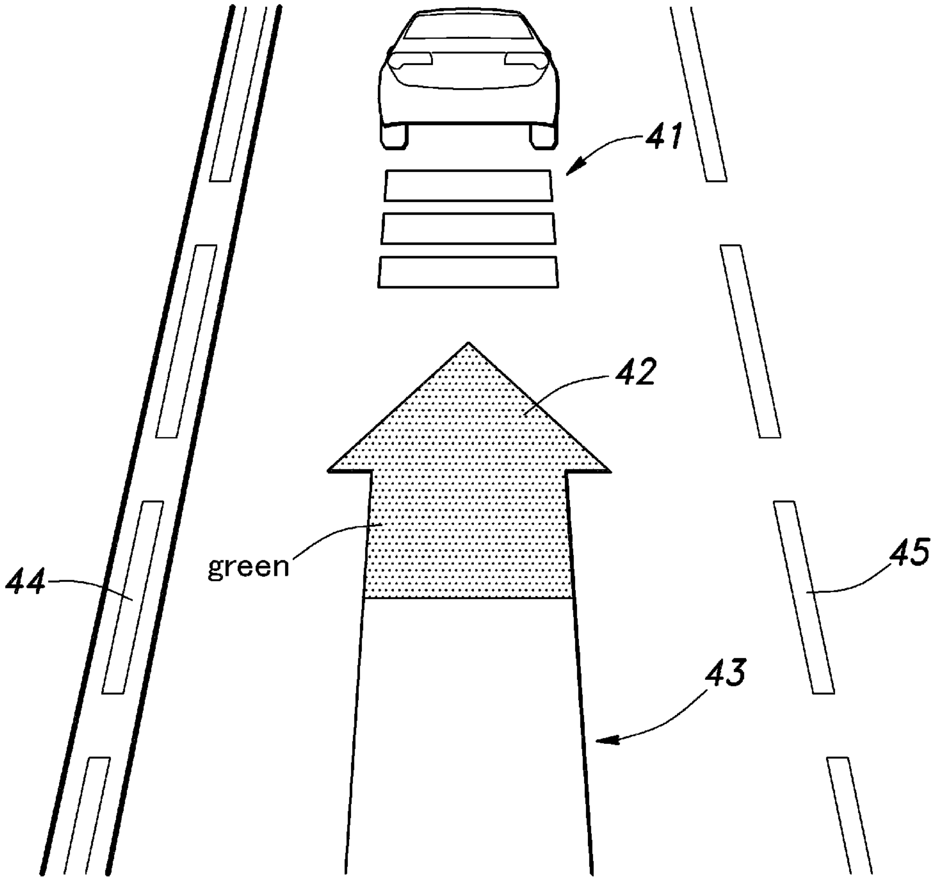
FIG. 8 shows a display example of a fifth embodiment of the display unit for the visualization of various lane change programs which is consolidated with a display unit for an adaptive cruise control system.

FIG. 8 shows a fifth embodiment of the visual display unit 10 according to the present invention which is combined with a display for an adaptive cruise control (ACC) system. The display includes an ACC system symbol 41 located in an upper central part of the display. This symbol 41 includes a rear view of a vehicle and three horizontal lines shown under the rear view of the vehicle to indicate that the ACC is being used. The vehicle is shown in a smaller scale and the number of the horizontal lines is increased, as the distance to the preceding vehicle is set to a greater distance.

An upwardly directed arrow 42 is shown under the ACC system symbol 41, and an upper part of the arrow represents a bar 43 which may be given either in red or green color depending on the permissibility of a lane change. When the bar 43 is red, the length thereof indicates the time period that must elapse before the vehicle driver is able to safely change lanes to the corresponding side. When the bar 43 is green, the length thereof indicates the time period remaining for the lane change to be safely made. The shape of the arrow 42 may be changed depending on the need for acceleration or deceleration. A pair of line markers 44 and 45 are represented on either side of the arrow 42, and the line marker 44 that is to be crossed to the desired lane change is highlighted when the lane change is not possible and not highlighted when the lane change is possible. Additionally or alternatively, when a lane change is permissible, the lane marker of the corresponding side may be made blink or indicated by a dotted line. Also, the line marker 44 that is to be crossed for the desired lane change may be shown in red when the lane change is not possible and in green when the lane change is possible.

As the display for an ACC system may have some common features as the display for the visualization of the change lane assist system, it is advantageous to combine the two display systems to avoid the cluttering of the dashboard or the display console of the vehicle.

Although the present invention has been described in terms of a preferred embodiment thereof, it is obvious to a person skilled in the art that various alterations and modifications are possible without departing from the scope of the present invention which is set forth in the appended claims.

The contents of the original Japanese patent application on which the Paris Convention priority claim is made for the present application, as well as those of the references mentioned in this application, are incorporated in this application by reference. Also, the contents of a PCT application filed by the same applicant on even date are also hereby incorporated by reference.

GLOSSARY

1 sensor device
2 environmental sensor
3 additional environmental sensor
4 driving condition detection device
5 driver intention detection device
6 driving assessment device
7 lane change program selection device
8 output device
9 lane change program computing device
10 display unit
11, 11', 16, 21, 31, 43 arrow
12, 12', 17, 22, 32, 42 bar
13, 13' highlighted part
14 central graphic
15 trapezoidal graphic

18, 23, 33 acceleration/deceleration symbol
24, 25, 34, 35, 44, 45 lane marker
41 ACC system symbol

The invention claimed is:

1. A lane change assist information visualization system, said lane change assist information visualization system comprising:

a sensor device comprising:

an ego vehicle sensing unit configured to detect a velocity of an ego vehicle;

an object vehicle sensing unit configured to detect at least a distance to the ego vehicle and a velocity of a surrounding vehicle; and a driver intention detecting unit configured to detect a driver's intention to change lanes;

a lane change program computing device configured to determine, according to signals received from the sensor device, (a) that a lane change possibility currently exists, and (b) a time period in which a lane change should be made; and a display unit configured to display the lane change possibility and the time period determined by the lane change program computing device, wherein the lane change program computing device is configured to further determine a position of an object vehicle in relation to which the time period in which a lane change should be made was determined, and the display unit is configured to further display, based on the position of the object vehicle determined by the lane change program computing device, a direction in which the object vehicle is located relative to the ego vehicle.

2. The lane change assist information visualization system according to claim 1, wherein the display unit indicates the existence and absence of the current lane change possibility in different colors.

3. The lane change assist information visualization system according to claim 1, wherein the time period is indicated by a length of a bar displayed on the display unit.

4. The lane change assist information visualization system according to claim 3, wherein the bar is displayed in an arrow displayed on the display unit to indicate a direction of the lane change.

5. The lane change assist information visualization system according to claim 1, wherein the display unit is configured to display a graphic representing a simplified bird's eye view of a profile of the ego vehicle, and the direction in which the object vehicle is located in relation to the ego vehicle is indicated by a line extending in a radial direction of the graphic.

6. The lane change assist information visualization system according to claim 1, wherein the display unit is configured to display a lane marker that changes appearance depending on the lane change possibility.

7. The lane change assist information visualization system according to claim 1, wherein the display unit is configured to display information produced by an adaptive cruise control system or a lane keeping system.

8. The lane change assist information visualization system according to claim 1, wherein the lane change program computing device is configured to further determine a time period that has to elapse before a lane change is allowed if a lane change possibility does not currently exist, and the display unit is configured to further display the time period that has to elapse before a lane change is allowed determined by the lane change program computing device.

9. The lane change assist information visualization system according to claim 1, wherein the lane change program computing device is configured to further determine whether a need for acceleration or deceleration exists, and the display unit is configured to further display the need for acceleration or deceleration determined by the lane change program computing device.

10. The lane change assist information visualization system according to claim 9, wherein the need for acceleration, need for deceleration and absence of the need for acceleration or deceleration are indicated by different graphics.

* * * * *